US012623506B2

(12) United States Patent
Kang et al.

(10) Patent No.: US 12,623,506 B2
(45) Date of Patent: May 12, 2026

(54) DEVICE AND METHOD FOR CONTROLLING A VEHICLE THAT SUPPORTS VEHICLE BOARDING AND EXITING OF PASSENGERS WITH MOBILITY DIFFICULTIES

(71) Applicants:HYUNDAI MOTOR COMPANY, Seoul (KR); KIA CORPORATION, Seoul (KR)

(72) Inventors: Yim Ju Kang, Seoul (KR); Hoon Lee, Gunpo-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 241 days.

(21) Appl. No.: 17/991,360

(22) Filed: Nov. 21, 2022

(65) Prior Publication Data

US 2023/0415536 A1     Dec. 28, 2023

(30) Foreign Application Priority Data

Jun. 28, 2022     (KR) ......................... 10-2022-0079184

(51) Int. Cl.
  *B60G 17/017*    (2006.01)
  *B60W 10/22*    (2006.01)
(52) U.S. Cl.
  CPC ........... *B60G 17/017* (2013.01); *B60W 10/22* (2013.01); *B60G 2500/30* (2013.01)
(58) Field of Classification Search
  CPC .............. B60G 17/017; B60G 2500/30; B60G 2202/152; B60G 2400/252;

(Continued)

(56) References Cited

U.S. PATENT DOCUMENTS 5,452,919 A     9/1995  Hoyle et al.
5,934,198 A *  8/1999  Fraser ..................... B61B 13/04
                                                                104/119

(Continued)

FOREIGN PATENT DOCUMENTS

JP       2004352043 A     12/2004
JP       2017519684 A      7/2017

(Continued)

OTHER PUBLICATIONS

NPL—English Translation—Kim—KR20200064684A Description (Year: 2025).*
Translation—WO2024157881A1 Description (Year: 2024).*

*Primary Examiner* — Angela Y Ortiz
*Assistant Examiner* — Charles Pall
(74) *Attorney, Agent, or Firm* — Lempia Summerfield Katz LLC

(57)          ABSTRACT

A device for controlling a vehicle includes: a sensor configured to obtain surroundings information of the vehicle and sensing a vehicle height; a location acquisition device configured to obtain a location of the vehicle; and a controller. The controller determines a location of a boarding gate of the vehicle based on a stopping location of the vehicle, determines information of a platform based on the boarding gate location, calculates a target vehicle height based on the platform information and boarding gate information, and controls a vehicle height of the vehicle based on the target vehicle height.

18 Claims, 14 Drawing Sheets

(58) Field of Classification Search
CPC ........ B60G 2401/174; B60G 2401/176; B60G
2401/21; B60G 2500/10; B60G 2600/11;
B60G 2800/0192; B60G 2800/0194;
B60G 2800/204; B60G 17/0165; B60G
2400/823; B60G 2401/142; B60G
2800/914; B60G 17/018; B60G 17/019;
B60G 2400/25; B60G 2800/202; B60W
10/22; B60W 30/18054; B60W 40/02;
B60W 40/10; B60W 2520/04; B60W
2520/06; B60W 2520/10; B60W 2556/45;
B60N 5/00; B60Y 2200/84; B60Y
2400/30
See application file for complete search history.

(56) References Cited

U.S. PATENT DOCUMENTS

| | | | |
|---|---|---|---|
| 7,261,304 B2 | 8/2007 | Trudeau et al. | |
| 7,389,210 B2 * | 6/2008 | Kagarlis | G06N 3/004 |
| | | | 703/2 |
| 7,389,994 B2 | 6/2008 | Trudeau et al. | |
| 10,300,758 B2 | 5/2019 | Guest et al. | |
| 10,604,150 B2 | 3/2020 | Fujiki | |
| 11,801,756 B2 * | 10/2023 | Deng | B60L 13/06 |
| 12,252,759 B2 * | 3/2025 | Lee | C21D 9/46 |
| 2005/0161891 A1 | 7/2005 | Trudeau et al. | |
| 2007/0246902 A1 | 10/2007 | Trudeau et al. | |
| 2014/0245548 A1 * | 9/2014 | Johnson | A61G 3/061 |
| | | | 14/71.3 |
| 2017/0203626 A1 | 7/2017 | Guest et al. | |
| 2018/0141547 A1 | 5/2018 | Fujiki | |
| 2020/0016951 A1 | 1/2020 | Letizio et al. | |
| 2021/0155264 A1 * | 5/2021 | MacPherson | A61G 3/065 |

FOREIGN PATENT DOCUMENTS

| | | | | |
|---|---|---|---|---|
| KR | 101109004 B1 | 1/2012 | | |
| KR | 20120050272 A | 5/2012 | | |
| KR | 101991611 B1 | 6/2019 | | |
| KR | 20200064684 A * | 6/2020 | | B60R 21/233 |
| KR | 102200808 B1 | 1/2021 | | |
| WO | WO-2023023693 A1 * | 3/2023 | | G01C 21/3602 |
| WO | WO-2024157881 A1 * | 8/2024 | | G05D 1/43 |

* cited by examiner

120

Rear Air Suspension     Front Air Suspension

1

DEVICE AND METHOD FOR CONTROLLING A VEHICLE THAT SUPPORTS VEHICLE BOARDING AND EXITING OF PASSENGERS WITH MOBILITY DIFFICULTIES

CROSS-REFERENCE TO RELATED APPLICATION

This application claims the benefit of priority to Korean Patent Application No. 10-2022-0079184, filed in the Korean Intellectual Property Office on Jun. 28, 2022, the entire contents of which are incorporated herein by reference.

TECHNICAL FIELD

The present disclosure relates to a device and a method for controlling a vehicle.

BACKGROUND

Boarding a vehicle when the height of the boarding gate is higher or lower than that of the platform is difficult for passengers with mobility difficulties (e.g., the weak and the elderly, the disabled, children, pregnant women, and the like). Accordingly, a technology that allows the passengers to move to the boarding gate using a boarding and exiting assist device has been developed. However, because the height of the boarding gate of the vehicle continues to change based on a changing environment of the vehicle, there is a limitation in that passengers have difficulty easily moving from the platform to the boarding gate even when using the boarding and exiting assist device.

SUMMARY

Therefore, in view of the foregoing, there is a demand for development of a technology capable of supporting safe boarding and exiting of passengers. The present disclosure has been made to solve the above-mentioned problems occurring in the prior art while advantages achieved by the prior art are maintained.

An aspect of the present disclosure provides a device and a method for controlling a vehicle that supports vehicle boarding and exiting of passengers with mobility difficulties.

The technical problems to be solved by the present disclosure are not limited to the aforementioned problems. Any other technical problems not mentioned herein should be clearly understood from the following description by those with ordinary skill in the art to which the present disclosure pertains.

According to an aspect of the present disclosure, a device for controlling a vehicle includes a sensor configured to obtain surroundings information of the vehicle and a controller. The controller determines a location of a boarding gate of the vehicle based on a stopping location of the vehicle and determines information of a platform based on the boarding gate location. The controller also calculates a target vehicle height based on the platform information and boarding gate information and controls a vehicle height of the vehicle based on the target vehicle height.

In one implementation, the controller may match the surroundings information with the boarding gate location to determine the platform information including at least one of a height of the platform or an inclination of the platform.

In one implementation, the device may further include a location acquisition device configured to obtain a location of the vehicle and providing a map of a peripheral region of the location of the vehicle.

In one implementation, the controller may match the map provided by the location acquisition device with the boarding gate location and determine the platform information including at least one of a height of the platform or an inclination of the platform from the map matched with the boarding gate location.

In one implementation, the device may further include a communication device configured to perform vehicle to everything (V2X) communication.

In one implementation, the controller may determine the platform information including at least one of a height of the platform or an inclination of the platform corresponding to the boarding gate location based on information received via the V2X communication.

In one implementation, the sensor may include a vehicle height sensor configured to detect the vehicle height.

In one implementation, the controller may determine the boarding gate information including at least one of a height of the boarding gate or an inclination of the boarding gate based on at least one of the surroundings information or the vehicle height.

In one implementation, the controller may calculate the target vehicle height based on a difference between the platform height and the boarding gate height.

In one implementation, the controller may calculate the target vehicle height based on the platform inclination and the boarding gate inclination.

In one implementation, the platform inclination may include a first inclination in a direction parallel to a travel direction of the vehicle and a second inclination in a direction perpendicular to the travel direction of the vehicle.

In one implementation, the controller may calculate the target vehicle height such that the difference between platform height and the boarding gate height is a preset first value.

In one implementation, the first value may be set such that corresponding to a length of step of a boarding passenger from the platform to the boarding gate.

In one implementation, the device may further include a boarding and exiting assist device connected or docked from the vehicle to the platform.

In one implementation, the controller may set the target vehicle height such that the difference between the platform height and the boarding gate height is a preset second value when connecting the boarding and exiting assist device to the platform.

In one implementation, the second value may be set such that a moving assist device moved using wheel is able to move from the platform to the boarding gate.

In one implementation, the controller may set the target vehicle height such that the platform height and the boarding gate height match with each other and the platform inclination and the boarding gate inclination match with each other when docking the boarding and exiting assist device to the platform.

In one implementation, the controller may calculate a suspension control amount for controlling at least one of a suspension respectively disposed in a left front portion, a right front portion, a left rear portion, and/or a right rear portion of the vehicle to control the vehicle height based on the target vehicle height. The controller may also control the at least one suspension with the suspension control amount.

In one implementation, the controller may calculate a required time required to control the vehicle height based on become the target vehicle height and may calculate a remaining time until the vehicle arrives at a stopping point. The controller may also control the vehicle to decelerate when the required time exceeds the remaining time until the vehicle arrives at the stopping point.

According to another aspect of the present disclosure, a method for controlling a vehicle includes: determining a location of a boarding gate of the vehicle based on a stopping location of the vehicle; determining information of a platform based on the boarding gate location; calculating a target vehicle height based on the platform information and boarding gate information; and controlling a vehicle height of the vehicle based on the target vehicle height.

BRIEF DESCRIPTION OF THE DRAWINGS

The above and other objects, features, and advantages of the present disclosure will be more apparent from the following detailed description taken in conjunction with the accompanying drawings.

DETAILED DESCRIPTION

Figure 1:
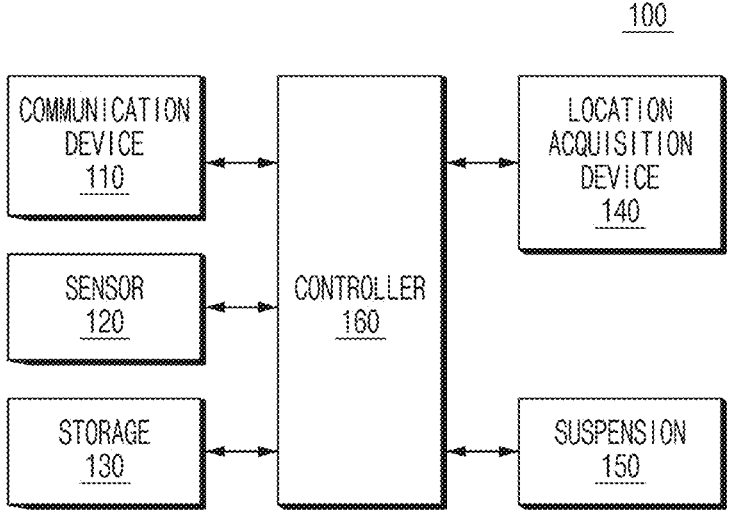
FIG. 1 is a view showing a configuration of a vehicle control device according to an embodiment of the present disclosure.

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function has been omitted when interfering with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order, or sequence of the components. Unless otherwise defined, all terms including technical and scientific terms used herein have the same meaning as commonly understood by one of ordinary skill in the art. It should be further understood that terms, such as those defined in commonly used dictionaries, should be interpreted as having a meaning that is consistent with their meaning in the context of the relevant art and should not be interpreted in an idealized or overly formal sense unless expressly so defined herein.

FIG. 1 is a view showing a configuration of a vehicle control device according to an embodiment of the present disclosure.

As shown in FIG. 1, a vehicle control device 100 according to an embodiment of the present disclosure may include a communication device 110, a sensor 120, storage 130, a location acquisition device 140, a suspension 150, and a controller 160.

The communication device 110 may be in vehicle to everything (V2X) communication with a target that may receive platform information and road information. According to an embodiment, the communication device 110 may be in communication with a server, a platform, a transportation infrastructure, or another vehicle via the V2X. According to an embodiment, the communication device 110 may receive the platform (a boarding location of the passenger) information (e.g., curb information) and the road information via the V2X communication and may receive a target vehicle height of the vehicle calculated from the server or the traffic infrastructure based on the platform information and the road information. According to an embodiment of the present disclosure, the communication device 110 may be in wireless communication using various wireless communication schemes such as a Wi-Fi, a WiBro, a global system for mobile communication (GSM), a code division multiple access (CDMA), a wideband code division multiple Access (WCDMA), a universal mobile telecommunication system (UMTS), a time division multiple access (TDMA), a long term evolution (LTE), and the like.

Figure 2:
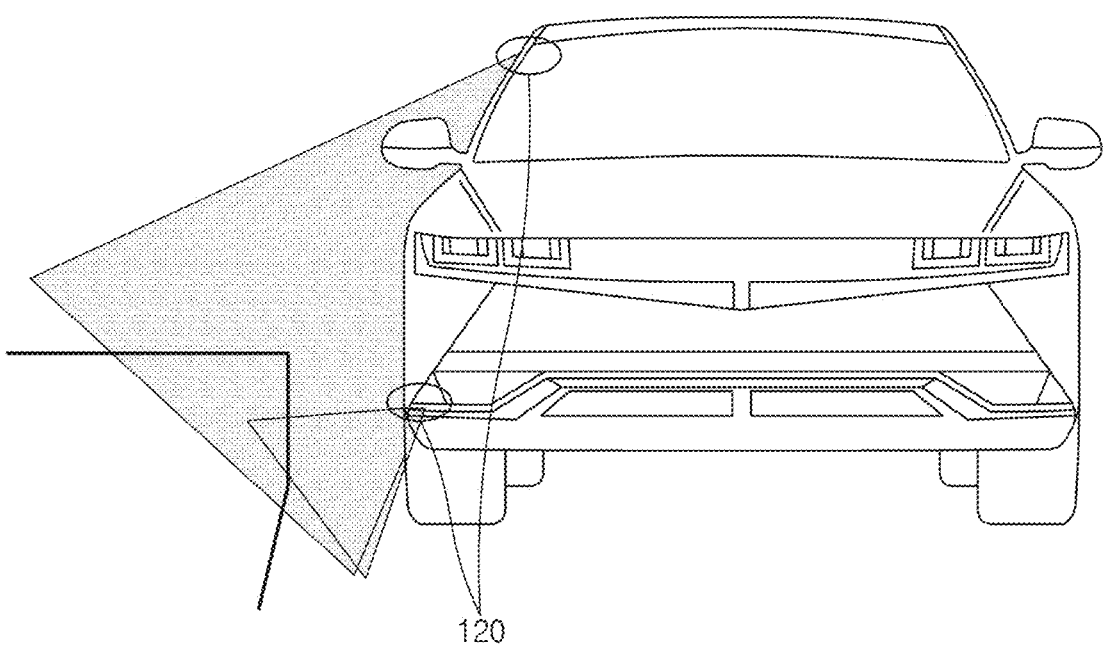
FIG. 2 is a view showing a sensing region of a sensor according to an embodiment of the present disclosure.

The sensor 120 may obtain surroundings information of a stopping location (a stopping-predicted-location) of the vehicle (see FIG. 2). To this end, according to an embodiment of the present disclosure, the sensor 120 may include a lidar, a radar, an image sensor, an ultrasonic sensor, an infrared sensor, and the like. The sensor 120 may obtain the surroundings information by sensing a peripheral region of the location where the vehicle will stop using the lidar, the radar, the image sensor, the ultrasonic sensor, the infrared sensor, and the like. In addition, the sensor 120 may include a vehicle height sensor that senses a distance (a vehicle body height) from the ground to a bottom of a vehicle body.

FIG. 2 is a view showing a sensing region of a sensor according to an embodiment of the present disclosure.

As shown in FIG. 2, according to an embodiment of the present disclosure, the sensor 120 may obtain the surroundings information by scanning a peripheral region (the curb) of the platform (the boarding location of the passenger) included in the peripheral region of the location where the vehicle will stop.

The storage 130 may store at least one algorithm for performing calculation or execution of various commands for an operation of the vehicle control device according to an embodiment of the present disclosure. The storage 130 may include at least one storage medium of a flash memory, a hard disk, a memory card, a read-only memory (ROM), a random-access memory (RAM), an electrically erasable programmable read-only memory (EEPROM), a programmable read-only memory (PROM), a magnetic memory, a magnetic disk, and an optical disk.

The location acquisition device 140 may obtain a location of the vehicle. According to an embodiment, the location acquisition device 140 may be equipped with a GPS receiver to obtain a current location of the vehicle and provide information of a peripheral region of the current location of the vehicle based on a map. According to an embodiment of the present disclosure, the map may contain a location of the platform where the passenger boards the vehicle and the platform information. According to an embodiment, the location acquisition device 140 may match a location of a boarding gate of the vehicle with the map and may provide the information (a height of the platform from the ground and an inclination of the platform) of the platform where the passenger boards the vehicle from the map matched with the location of the boarding gate. The location acquisition device 140 may have a separate output device and may provide various types of information related to map information visually and audibly. According to an embodiment, the output device may include a display and a sound output device. According to an embodiment of the present disclosure, the location acquisition device 140 may be implemented as a navigation.

The suspension 150 may include a damper that absorbs vibration such that an impact or the vibration generated or caused by an obstacle on a road is not transmitted directly to the vehicle body or the passenger. The controller 160 may calculate a suspension control amount, control the suspension 150 with the suspension control amount to control the height of the vehicle body, and increase a damping force of the damper to minimize the vibration of the vehicle when the vehicle stops. The suspension may include an air suspension (see FIG. 3), a MacPherson Strut suspension, or the like. A more detailed description is made with reference to FIG. 3.

Figure 3:
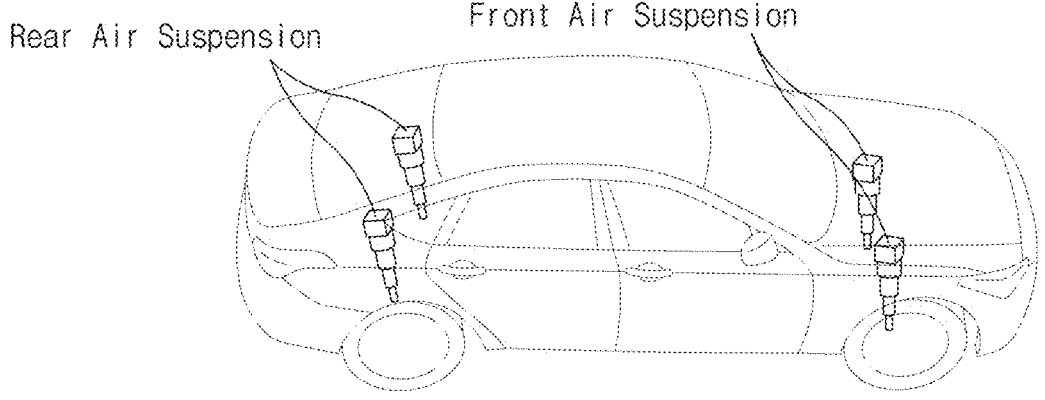
FIG. 3 is a view showing a suspension according to an embodiment of the present disclosure.

FIG. 3 is a view showing a suspension according to an embodiment of the present disclosure.

According to an embodiment of the present disclosure, as shown in FIG. 3, a suspension 150, i.e. separate suspension components, may be disposed at each of four wheels. The controller 160 may independently control each wheel suspension 150 respectively disposed at the four wheels.

The controller 160 may be implemented by various processing devices such as a microprocessor or the like having a semiconductor chip capable of performing the calculation or the execution of the various commands. The controller 160 may control the operation of the vehicle control device according to an embodiment of the present disclosure.

According to an embodiment, the controller 160 may determine the stopping location of the vehicle and determine the location of the boarding gate of the vehicle based on the stopping location of the vehicle. The controller 160 may determine the stopping location when the vehicle stops and may predict the stopping location based on the platform location when the vehicle has not stopped yet. Therefore, the stopping location of the vehicle of the present disclosure may include the location obtained when the vehicle stops and the stopping-predicted-location.

In this regard, the boarding gate of the vehicle may include a portion where the passenger is able to board the vehicle and alight from or exit the vehicle and have a door that is able to be opened and closed. According to an embodiment, the controller 160 may determine the location of the boarding gate based on the stopping location (the stopping-predicted-location) of the vehicle on the map.

When determining the location of the boarding gate from the stopping location (the stopping-predicted-location) of the vehicle, the controller 160 may determine the platform information based on the boarding gate location.

According to an embodiment, the controller 160 may determine the information of the platform where the passenger boards the vehicle based on the surroundings information and the boarding gate location sensed by the sensor 120. According to an embodiment, the controller 160 may determine the platform information including one of the platform height and the platform inclination by matching the surroundings information with the boarding gate location. However, the present disclosure is not limited thereto. According to another embodiment, the controller 160 may match the map provided by the location acquisition device 140 with the boarding gate location and determine the platform information including one of the platform height and the platform inclination from the map matched with the boarding gate location. According to another embodiment, the controller 160 may receive the platform information via the V2X communication and may determine the platform information including one of the platform height and the platform inclination based on the received information.

The controller 160 may determine boarding gate information. According to an embodiment, the controller 160 may determine a height of the boarding gate and an inclination of the boarding gate based on the vehicle body height sensed by the vehicle height sensor. The controller 160 may determine the height of the boarding gate and the inclination of the boarding gate based on the vehicle body height sensed using the sensor that may sense the vehicle body height and a height design value of the boarding gate.

The controller 160 may calculate a target vehicle height that may facilitate the passenger's vehicle boarding and exiting. According to an embodiment, the controller 160 may calculate the target vehicle height based on the platform information and the boarding gate information. In addition, the controller 160 may calculate the suspension control amount for controlling at least one suspension respectively disposed at a left front portion, a right front portion, a left rear portion, and a right rear portion of the vehicle to control the vehicle height of the vehicle based on the target vehicle height. The controller 160 may also control the at least one suspension with the suspension control amount.

According to an embodiment of the present disclosure, the controller 160 may calculate the target vehicle height based on the platform inclination and the boarding gate inclination. For example, the controller 160 may calculate the target vehicle height such that the platform inclination and the boarding gate inclination are the same with each other. A more detailed description will be made with reference to FIGS. 4-7.

Figure 4:
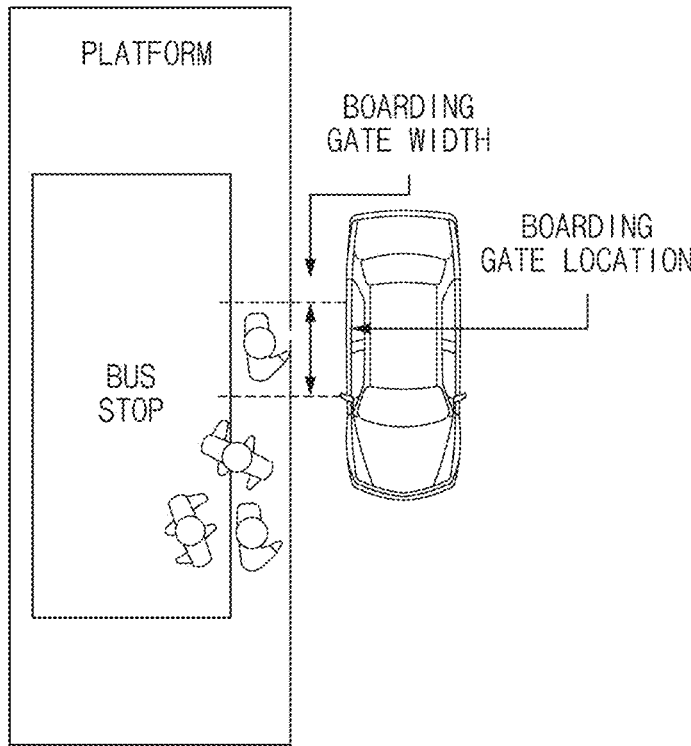
FIG. 4 is a view schematically showing a boarding gate location and a boarding gate width determined according to an embodiment of the present disclosure.
Figure 5:
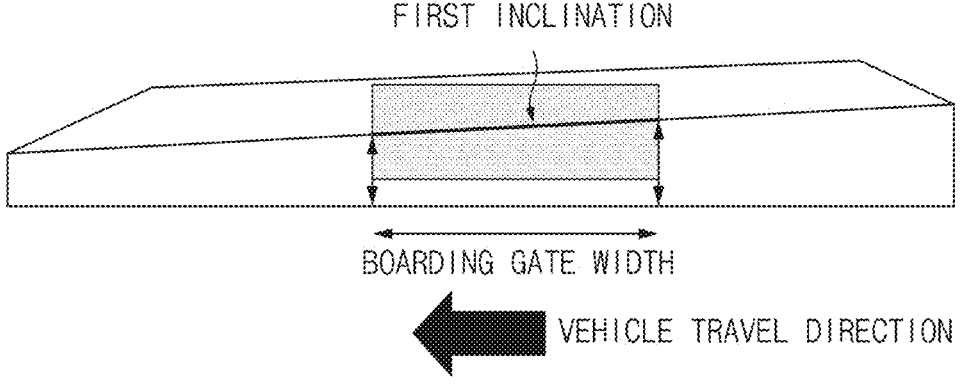
FIGS. 5 and 6 are views showing a platform inclination according to an embodiment of the present disclosure.
Figure 6:
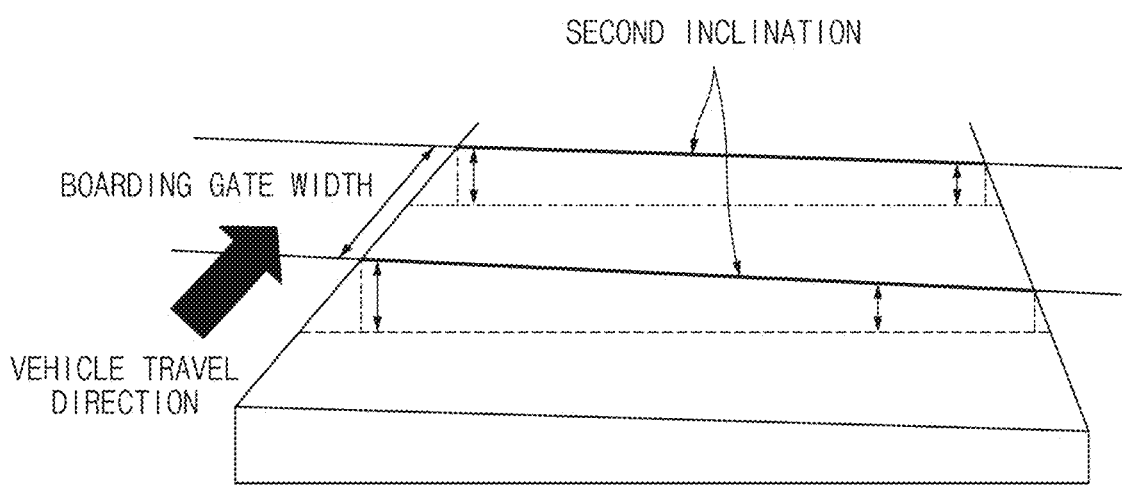

FIG. 4 is a view schematically showing a boarding gate location and a boarding gate width determined according to an embodiment of the present disclosure. FIGS. 5 and 6 are views showing a platform inclination according to an embodiment of the present disclosure.

As shown in FIG. 4, the controller 160 may determine a sum of a width of the door through which the passenger may board the vehicle and exit from the vehicle and capable of being opened and closed as a width of the boarding gate. In addition, as shown in FIGS. 5 and 6, the controller 160 may calculate a platform inclination of a platform region corresponding to the boarding gate width by matching the boarding gate width to the platform. In this regard, the platform inclination may include a first inclination by a platform inclination in a direction parallel to a travel direction of the vehicle and a second inclination by a platform inclination in a direction perpendicular to the travel direction of the vehicle.

When connecting a boarding and exiting assist device to the platform, the controller 160 may obtain the vehicle body height of each of the left front portion, the right front portion, the left rear portion, and the right rear portion of the vehicle using the vehicle height sensor. The controller 160 may calculate the target vehicle height such that the inclination of the boarding gate is the same as the first inclination and inclinations of the boarding and exiting assist device are the same as the first inclination and the second inclination. In this regard, the boarding and exiting assist device may be inserted into the vehicle and then protrude onto and be connected to the platform or may protrude into and be connected (docked) to the platform under the control of the controller 160. Specifically, this is described with reference to FIG. 7.

Figure 7:
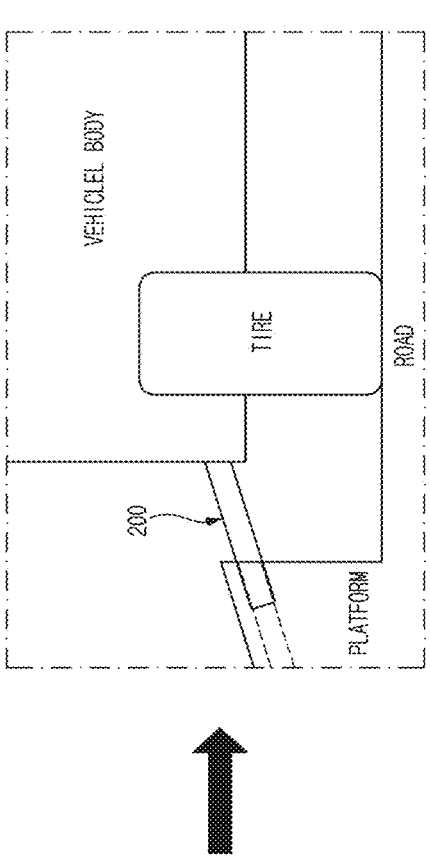
FIG. 7 is a view showing a scheme of calculating a target vehicle height when a boarding and exiting assist device is connected (docked) into a platform according to an embodiment of the present disclosure.
Figure 7:
Figure 7:
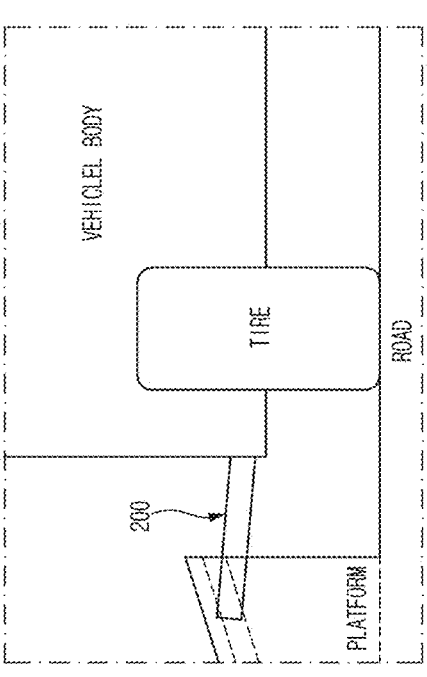

FIG. 7 is a view showing a scheme of calculating a target vehicle height when a boarding and exiting assist device is connected (docked) into a platform according to an embodiment of the present disclosure.

As shown in FIG. 7, when a boarding and exiting assist device 200 is not able to be connected into the platform because of the platform inclination (the second inclination, see FIG. 6), the controller 160 may calculate the target vehicle height of each of the left front portion, the right front portion, the left rear portion, and the right rear portion such that the inclination of the boarding and exiting assist device is the same as the platform inclination (the second inclination). In this case, the controller 160 may calculate a suspension control amount for the suspension of each of the right front portion, the left front portion, the right rear portion, and the left rear portion based on the vehicle height (the vehicle body height) of each of the left front portion, the right front portion, the left rear portion, and the right rear portion. When controlling the suspension with the calculated suspension control amount, the controller 160 may control the boarding and exiting assist device 200 to be connected (docked) into the platform.

According to an embodiment of the present disclosure, the controller 160 may calculate a difference between the platform height and the boarding gate height and may calculate the target vehicle height based on the height difference. According to an embodiment, a scheme of calculating the target vehicle height is described by dividing a case in which the boarding and exiting assist device is connected to the platform and a case in which the boarding and exiting assist device is not connected to the platform.

Figure 8:
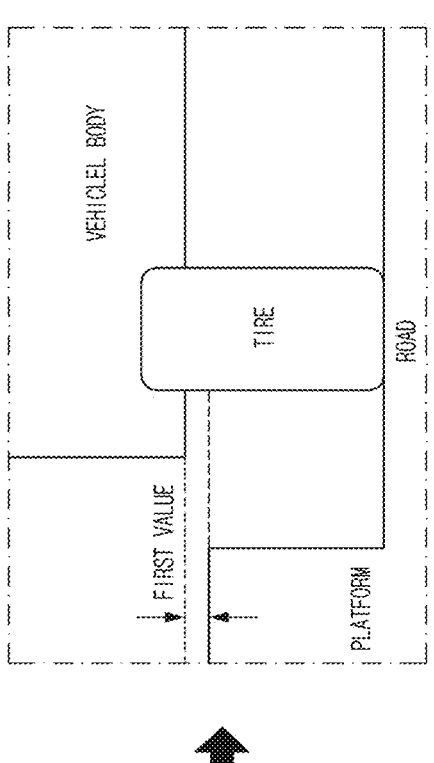
FIGS. 8 and 9 are views showing a scheme of calculating a target vehicle height when there is no boarding and exiting assist device according to an embodiment of the present disclosure.
Figure 8:
Figure 8:
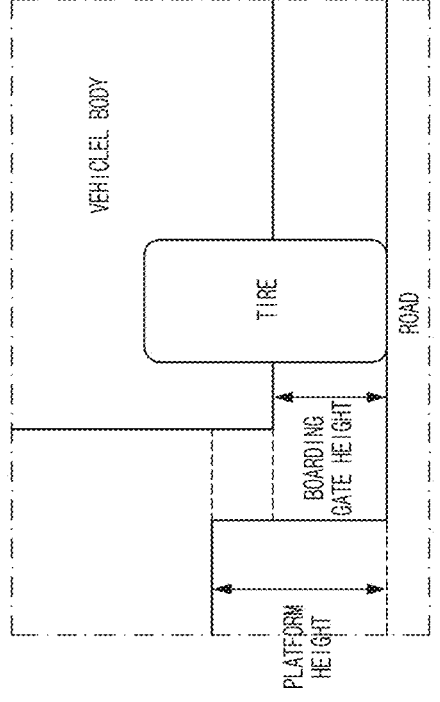
Figure 9:
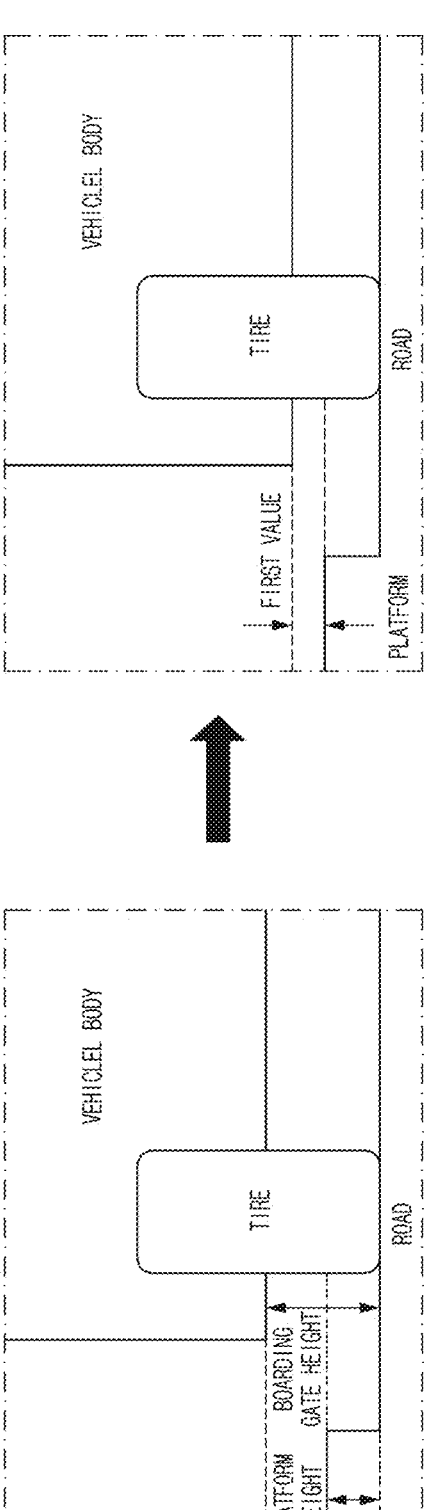

FIGS. 8 and 9 are views schematically showing a scheme of calculating a target vehicle height when a boarding and exiting assist device is not connected to a platform.

When the difference between the boarding gate height and the platform height is determined to exceed a threshold (i.e., the boarding gate height is lower than the platform height as shown in FIG. 8 or the boarding gate height is higher than the platform height as shown in FIG. 9), the controller 160 may determine that a passenger with mobility difficulties will not easily be able to board the vehicle. Therefore, the controller 160 may calculate the target vehicle height such that the difference between the boarding gate height and the platform height becomes a first value, may calculate the suspension control amount to control the vehicle height of the vehicle based on the target vehicle height, and may control the suspension with the suspension control amount. In this regard, the first value may be preset and stored. According to an embodiment, the first value may be set such that corresponding to a length of step of a boarding passenger from the platform to the boarding gate. According to an embodiment, the length of step of a boarding passenger includes the length of step of children. The children may board the boarding gate of the vehicle on their own.

Figure 10:
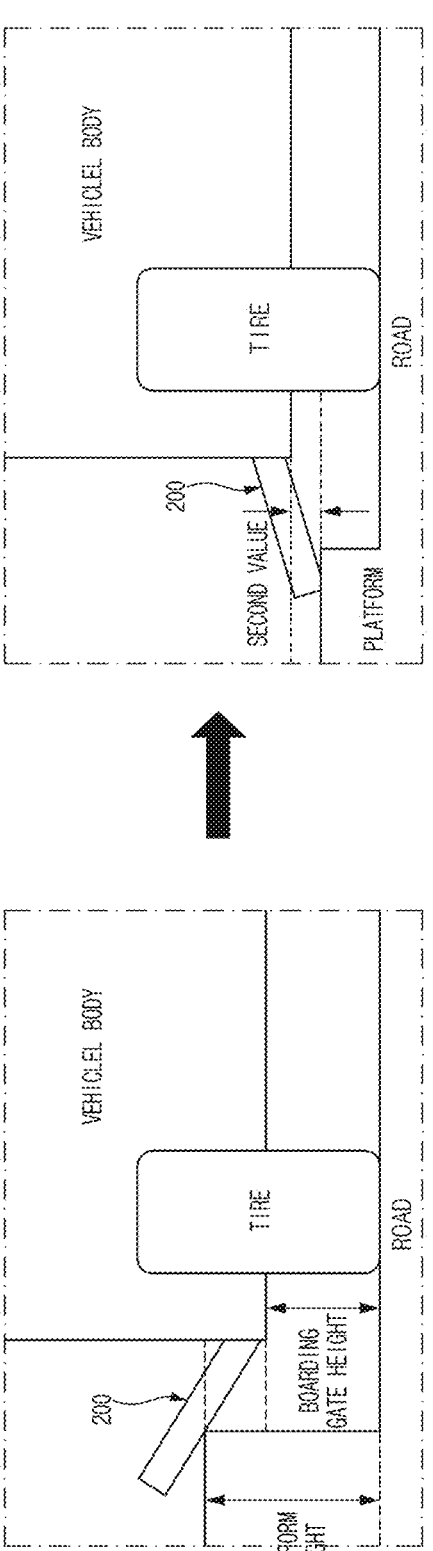
FIGS. 10 and 11 are views showing a scheme of calculating a target vehicle height when there is a boarding and exiting assist device according to an embodiment of the present disclosure.
Figure 11:
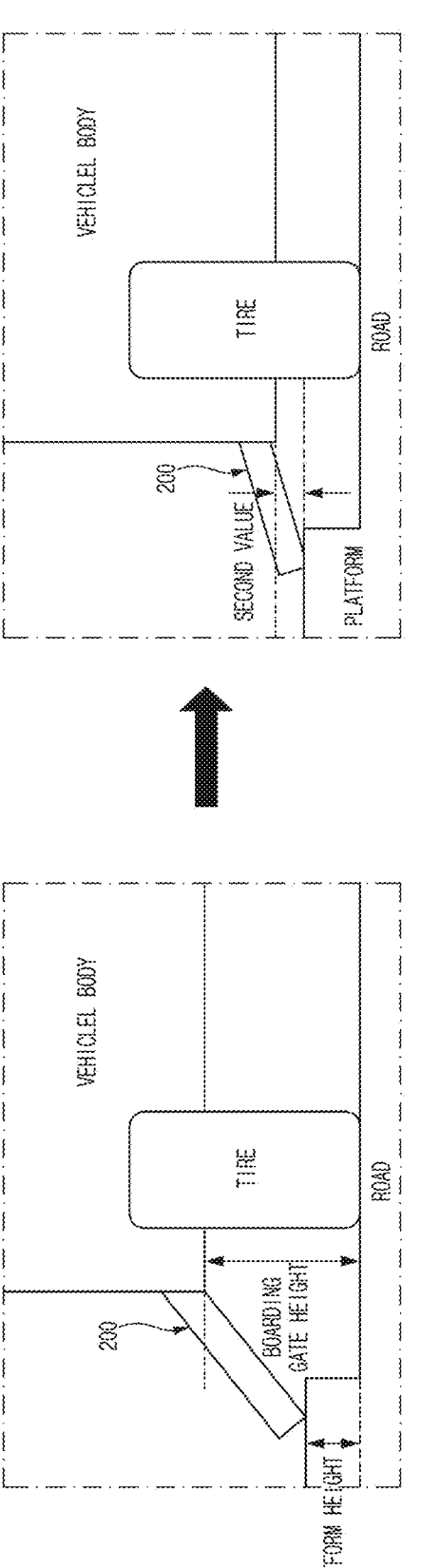

FIGS. 10 and 11 are views schematically showing a scheme of calculating a target vehicle height when a boarding and exiting assist device is connected to a platform.

When the difference between the boarding gate height and the platform height is determined to exceed the threshold (i.e., the boarding gate height is lower than the platform height as shown in FIG. 10 or the boarding gate height is higher than the platform height as shown in FIG. 11), the controller 160 may determine that the boarding and exiting assist device 200 is not able to be connected to the platform for a passenger on a wheelchair or a passenger with the mobility difficulties to easily move because of the difference between the boarding gate height and the platform height. Therefore, the controller 160 may calculate the target vehicle height such that the difference between the boarding gate height and the platform height becomes a second value, may calculate the suspension control amount to control the vehicle height of the vehicle based on the target vehicle height, and may control the suspension with the suspension control amount. In this regard, the second value may be preset and stored. According to an embodiment, the second value may be set such that a moving assist device moved using wheel is able to move from the platform to the boarding gate. According to an embodiment, the moving assist device includes a wheelchair.

According to another embodiment of the present disclosure, when the vehicle has a history of stopping on the platform, the controller 160 may store the boarding gate location, the boarding gate information, and the platform information. When the vehicle has a history of stopping on the platform where the vehicle is going to stop, the target vehicle height may be calculated based on the previously stored boarding gate information and platform information. In addition, when receiving the platform information via the V2X communication, the controller 160 may calculate the target vehicle height based on the received platform information and a location of the boarding gate where the vehicle is expected to stop.

In addition, a required time required to control the vehicle height of the vehicle based on the target vehicle height may be calculated. In addition, the controller 160 may determine whether the required time exceeds a remaining time until the vehicle arrives at a stopping point.

When the required time exceeds the remaining time until the vehicle arrives at the stopping point, the controller 160 may determine that a vehicle height of the vehicle before the vehicle arrives at the stopping point is difficult to be controlled based on the target vehicle height. The controller 160 may also control the vehicle height while decelerating.

On the other hand, when the required time does not exceed the remaining time until the vehicle arrives at the stopping point, the controller 160 may determine that the vehicle height of the vehicle before the vehicle arrives at the stopping point may be controlled based on the target vehicle height. The controller 160 may also control the vehicle height of the vehicle with the target vehicle height while traveling to the stopping point of the vehicle.

The controller 160 may control the vehicle to stop when the vehicle arrives at the stopping point and may control the suspension to increase the damping force of the damper to minimize shaking of the vehicle during the boarding of the passenger.

The controller 160 may control the boarding and exiting assist device to be connected (docked) to the platform.

The controller 160 may determine whether the vehicle height is changed after the passenger boards the vehicle and may control the target vehicle height to be maintained when the vehicle height is changed.

Figure 12:
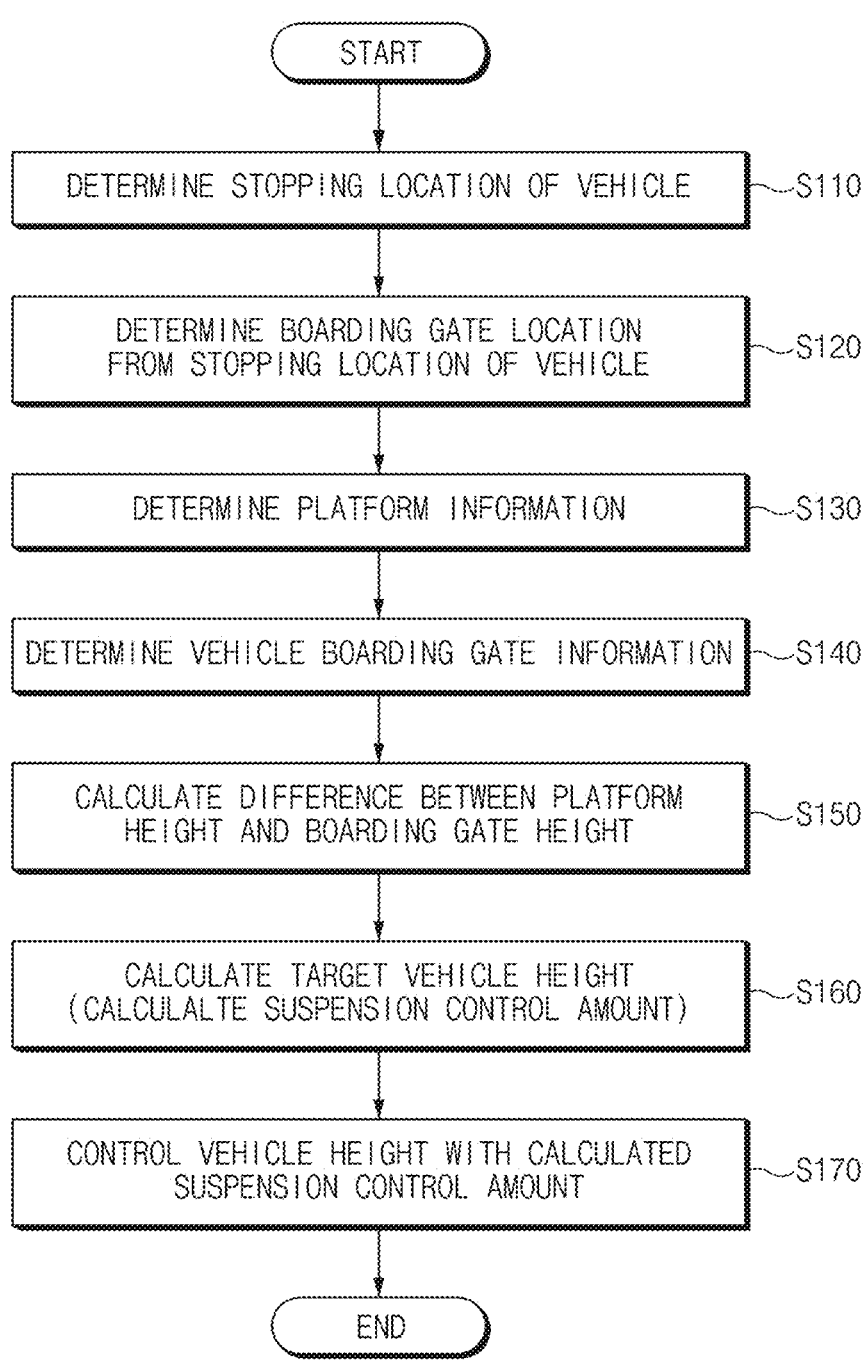
FIGS. 12 and 13 are flowcharts showing a vehicle control method according to an embodiment of the present disclosure.
Figure 13:
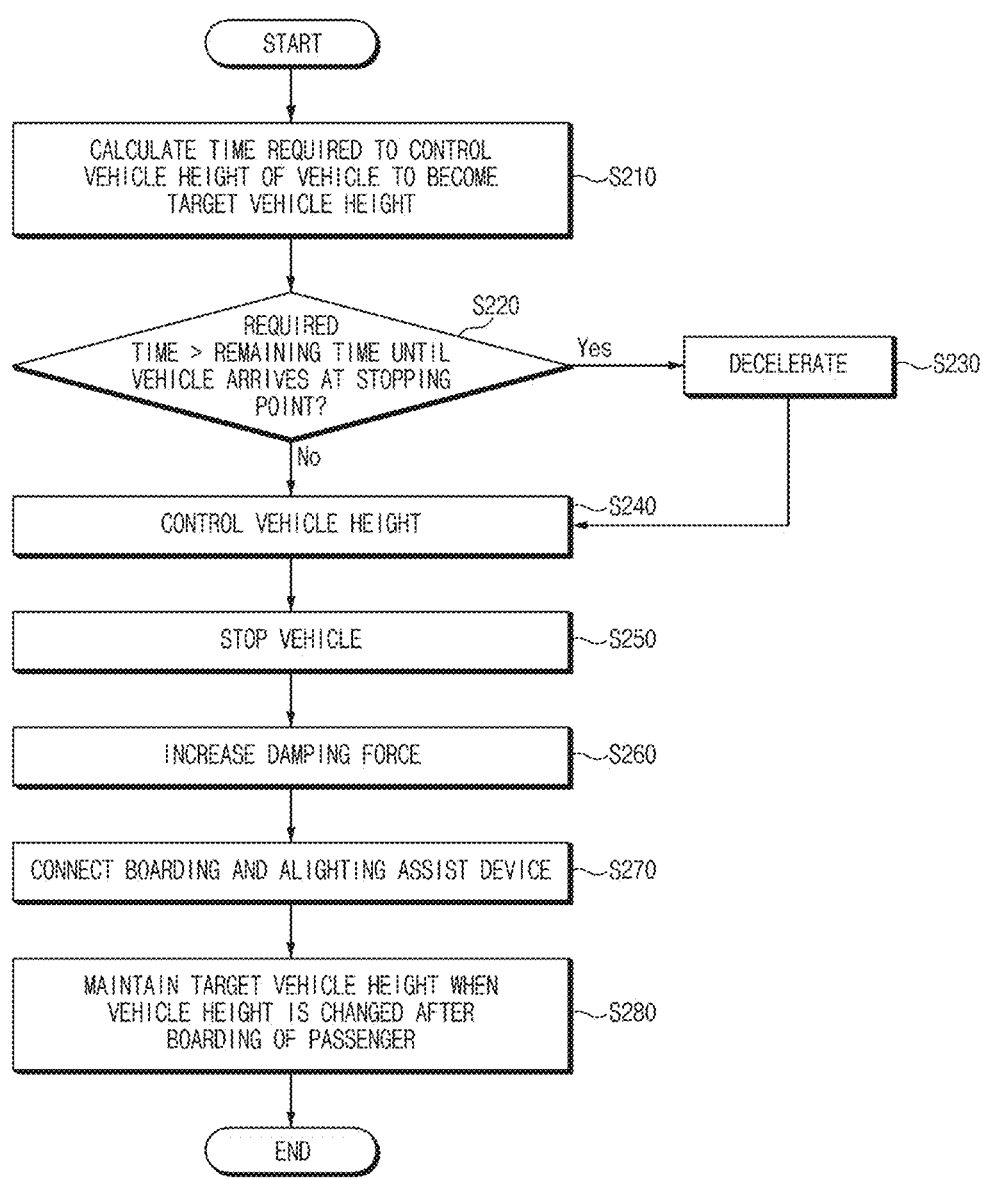

FIGS. 12 and 13 are flowcharts showing a vehicle control method according to an embodiment of the present disclosure.

As shown in FIG. 12, the controller 160 may determine the stopping location of the vehicle (S110). The controller 160 may determine the stopping location when the vehicle stops and may predict the stopping location based on the platform location when the vehicle has not stopped yet. Therefore, the stopping location of the vehicle of the present disclosure may include the location obtained when the vehicle stops and the stopping-predicted-location.

The controller 160 may determine the boarding gate location from the stopping location (the stopping-predicted-location) of the vehicle (S120). In this regard, the boarding gate of the vehicle may include the portion where the passenger is able to board the vehicle and exit from the vehicle and having the door that is able to be opened and closed. According to an embodiment, the controller 160 may determine the location of the boarding gate based on the stopping location of the vehicle on the map.

When determining the boarding gate location from the stopping location of the vehicle, the controller 160 may determine the platform information based on the boarding gate location (S130).

According to an embodiment, in S130, the controller 160 may determine the information of the platform where the passenger boards the vehicle based on the surroundings information and the boarding gate location sensed by the sensor 120. According to an embodiment, the controller 160 may determine the platform information including one of the platform height and the platform inclination by matching the surroundings information with the boarding gate location. However, the present disclosure is not limited thereto. According to another embodiment, the controller 160 may match the map provided by the location acquisition device 140 with the boarding gate location and may determine the platform information including one of the platform height and the platform inclination from the map matched with the boarding gate location. According to another embodiment, the controller 160 may receive the platform information via the V2X communication and may determine the platform information including one of the platform height and the platform inclination based on the information received via the V2X communication.

The controller 160 may determine the boarding gate information (S140).

According to an embodiment, in S140, the controller 160 may determine the boarding gate height and the boarding gate inclination based on the vehicle body height sensed by the vehicle height sensor. The controller 160 may determine the boarding gate height and the boarding gate inclination based on the vehicle body height sensed using the sensor that may sense the vehicle body height and the height design value of the boarding gate.

The controller 160 may calculate the difference between the platform height and the boarding gate height (S150).

In S150, when determining that the difference between the platform height and the boarding gate height exceeds the threshold, the controller 160 may determine that the passenger's boarding is not easy.

The controller 160 may calculate the target vehicle height to facilitate the passenger's boarding and calculate the suspension control amount to control the vehicle height of the vehicle based on the target vehicle height (S160).

In S160, the controller 160 may calculate the target vehicle height by setting the difference between the platform height and the boarding gate height such that the passenger may easily board the vehicle based on whether the boarding and exiting assist device is connected to the platform.

According to an embodiment, when the boarding and exiting assist device is not connected with the platform, the controller 160 may set the difference between the platform height and the boarding gate height to be the first value and calculate the target vehicle height. In this regard, the first value may be preset and stored. According to an embodiment, the first value may be set such that corresponding to a length of step of a boarding passenger from the platform to the boarding gate. According to an embodiment, the length of step of a boarding passenger includes the length of step of children. The children may board the boarding gate of the vehicle on their own.

On the other hand, when the boarding and exiting assist device is connected to the platform, the controller 160 may set the difference between the platform height and the boarding gate height to be the second value and calculate the target vehicle height. In this regard, the second value may be preset and stored. According to an embodiment, the second value may be set such that a moving assist device moved using wheel is able to move from the platform to the boarding gate. According to an embodiment, the moving assist device includes a wheelchair. The controller 160 may control the suspension with the calculated suspension control amount (S170).

As shown in FIG. 13, when the vehicle has the history of stopping on the platform where the vehicle is to be stopped, the controller 160 may calculate the target vehicle height based on the previously stored platform information and boarding gate information. In addition, when receiving the platform information via the V2X communication, the controller 160 may calculate the target vehicle height based on the received platform information and the location of the boarding gate where the vehicle is expected to stop.

The controller 160 may calculate the required time required to control the vehicle height of the vehicle based on the target vehicle height (S210).

The controller 160 may determine whether the required time exceeds the remaining time until the vehicle arrives at the stopping point (S220).

When it is determined in S220 that the required time exceeds the remaining time until the vehicle arrives at the stopping point (Yes), the controller 160 may control the vehicle to decelerate (S230) and may control the vehicle height based on the target vehicle height until the vehicle arrives at the stopping point while decelerating (S240).

On the other hand, when it is determined in S220 that the required time does not exceed the remaining time until the vehicle arrives at the stopping point (No), the controller 160 may control the vehicle height based on the target vehicle height until the vehicle arrives at the stopping point (S240).

The controller 160 may control the vehicle to stop when the vehicle arrives at the stopping point (S250). The controller 160 may control the suspension to increase the damping force of the damper to minimize the shaking of the vehicle during the boarding of the passenger (S260).

The controller 160 may control the boarding and exiting assist device to be connected (docked) with the platform (S270).

The controller 160 may control the target vehicle height to be maintained when the vehicle height is changed after the boarding of the passenger (S280).

Figure 14:
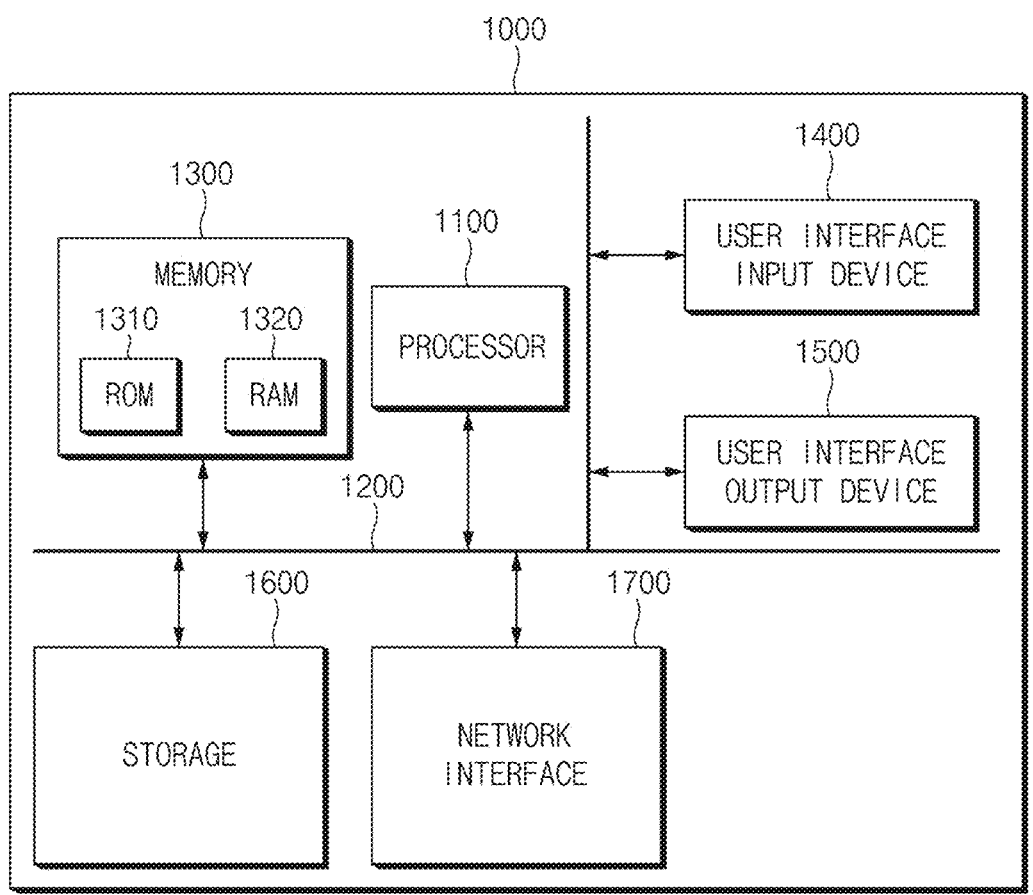
FIG. 14 is a view showing a configuration of a computing system for executing a method according to an embodiment of the present disclosure.

FIG. 14 is a view showing a configuration of a computing system for executing a method according to an embodiment of the present disclosure.

Referring to FIG. 14, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a Read Only Memory (ROM) 1310 and a Random Access Memory (RAM) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an erasable programmable read-only memory (EPROM), an EEPROM, a register, a hard disk, a removable disk, and a CD-ROM. The storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure. Various modifications and changes may be made by those of ordinary skill in the art without departing from the essential characteristics of the present disclosure.

Therefore, the embodiments disclosed in the present disclosure are not intended to limit the technical idea of the present disclosure but to illustrate the present disclosure. The scope of the technical idea of the present disclosure is not limited by the embodiments. The scope of the present disclosure should be construed as being covered by the scope of the appended claims. All technical ideas falling within the scope of the claims should be construed as being included in the scope of the present disclosure.

The device and the method for controlling the vehicle according to one embodiment of the present disclosure provide an effect of securing safety of the passenger by supporting the vehicle boarding and exiting of the passenger with the mobility difficulties even in various stopping environments of the vehicle.

Hereinabove, although the present disclosure has been described with reference to various embodiments and the accompanying drawings, the present disclosure is not limited thereto, but may be variously modified and altered by those of ordinary skill in the art to which the present disclosure pertains without departing from the spirit and scope of the present disclosure claimed in the following claims.

What is claimed is:

1. A device for controlling a vehicle, the device comprising:

a sensor configured to obtain surroundings information of the vehicle; and a controller, wherein the controller is configured to determine a boarding gate location of a boarding gate of the vehicle based on a stopping location of the vehicle, determine platform information of a platform based on the boarding gate location, calculate a target vehicle height based on the platform information and boarding gate information, and control a vehicle height of the vehicle based on the target vehicle height, wherein the platform information includes a platform inclination of the platform, wherein the controller is further configured to calculate the platform inclination corresponding to a boarding gate width by matching the boarding gate width to the platform, wherein the platform inclination includes a first inclination in a direction parallel to a travel direction of the vehicle and a second inclination in a direction perpendicular to the travel direction of the vehicle, and wherein the controller is further configured to:

calculate a required time required to control the vehicle height based on the target vehicle height and calculate a remaining time until the vehicle arrives at a stopping point; and control the vehicle to decelerate when the required time exceeds the remaining time until the vehicle arrives at the stopping point.

2. The device of claim 1, wherein the controller is configured to match the surroundings information with the boarding gate location to determine the platform information including a height of the platform.

3. The device of claim 1, further comprising:

a location acquisition device configured to obtain a location of the vehicle and providing a map of a peripheral region of the location of the vehicle.

4. The device of claim 3, wherein the controller is configured to:

match the map provided by the location acquisition device with the boarding gate location; and determine the platform information including at least one of a height of the platform or an inclination of the platform from the map matched with the boarding gate location.

5. The device of claim 1, further comprising:

a communication device configured to perform vehicle to everything (V2X) communication.

6. The device of claim 5, wherein the controller is configured to determine the platform information including at least one of a platform height of the platform or an inclination of the platform corresponding to the boarding gate location based on information received via the V2X communication.

7. The device of claim 2, wherein the sensor includes a vehicle height sensor configured to detect the vehicle height of the vehicle.

8. The device of claim 7, wherein the controller is configured to determine the boarding gate information including at least one of a boarding gate height of the boarding gate or a boarding gate inclination of the boarding gate based on at least one of the surroundings information or the vehicle height.

9. The device of claim 8, wherein the controller is configured to calculate the target vehicle height based on a difference between a platform height and the boarding gate height.

10. The device of claim 8, wherein the controller is configured to calculate the target vehicle height based on the platform inclination and the boarding gate inclination.

11. The device of claim 9, wherein the controller is configured to calculate the target vehicle height such that the difference between the platform height and the boarding gate height is a preset first value.

12. The device of claim 11, wherein the preset first value is set such that corresponding to a length of step of a boarding passenger from the platform to the boarding gate.

13. The device of claim 9, further comprising:
  a boarding and exiting assist device connected or docked from the vehicle to the platform.

14. The device of claim 13, wherein the controller is configured to set the target vehicle height such that the difference between the platform height and the boarding gate height is a preset second value when connecting the boarding and exiting assist device to the platform.

15. The device of claim 14, wherein the preset second value is set such that a moving assist device moved using wheel is able to move from the platform to the boarding gate.

16. The device of claim 14, wherein the controller is configured to set the target vehicle height such that the platform height and the boarding gate height match with each other and the platform inclination and the boarding gate inclination match with each other when docking the boarding and exiting assist device to the platform.

17. The device of claim 1, wherein the controller is configured to:
  calculate a suspension control amount for controlling at least one of a suspension respectively disposed at a left front portion, a right front portion, a left rear portion, or a right rear portion of the vehicle to control the vehicle height based on the target vehicle height; and
control the suspension with the suspension control amount.

18. A method for controlling a vehicle, the method comprising:
  determining a boarding gate location of a boarding gate of the vehicle based on a stopping location of the vehicle;
  determining platform information of a platform based on the boarding gate location;
  calculating a target vehicle height based on the platform information and boarding gate information; and
  controlling a vehicle height of the vehicle based on the target vehicle height,
  wherein the platform information includes a platform inclination of the platform,
  wherein the method further comprises:
    calculating the platform inclination corresponding to a boarding gate width by matching the boarding gate width to the platform,
  wherein the platform inclination includes a first inclination in a direction parallel to a travel direction of the vehicle and a second inclination in a direction perpendicular to the travel direction of the vehicle, and
  wherein the method further comprises:
    calculating a required time required to control the vehicle height based on the target vehicle height and calculating a remaining time until the vehicle arrives at a stopping point; and
    controlling the vehicle to decelerate when the required time exceeds the remaining time until the vehicle arrives at the stopping point.

* * * * *